United States Patent [19]

Fukushima

[11] Patent Number: 4,846,328

[45] Date of Patent: * Jul. 11, 1989

[54] FLYWHEEL ASSEMBLY

[75] Inventor: Hirotaka Fukushima, Hirakata, Japan

[73] Assignee: Kabushiki Kaisha Daikin Seisakusho, Osaka, Japan

[ * ] Notice: The portion of the term of this patent subsequent to Jun. 21, 2005 has been disclaimed.

[21] Appl. No.: 165,963

[22] Filed: Mar. 9, 1988

Related U.S. Application Data

[62] Division of Ser. No. 8,224, Jan. 29, 1987.

[30] Foreign Application Priority Data

Jan. 30, 1986 [JP] Japan ................................. 61-12168
Feb. 4, 1986 [JP] Japan ................................. 61-14966
Feb. 4, 1986 [JP] Japan ................................. 61-22427
Feb. 4, 1986 [JP] Japan ................................. 61-22428

[51] Int. Cl.[4] .............................................. F16D 3/14
[52] U.S. Cl. .................................. 192/106.2; 74/574; 192/106.1

[58] Field of Search ................. 192/30 V, 48.1, 106.2, 192/48.8, 106.1; 74/572, 574; 464/66

[56] References Cited

U.S. PATENT DOCUMENTS 4,751,993 6/1988 Fukushima ..................... 192/106.1

FOREIGN PATENT DOCUMENTS 3412961 10/1985 Fed. Rep. of Germany .
2153929 8/1985 United Kingdom ............... 192/48.1

Primary Examiner—Rodney H. Bonck
Attorney, Agent, or Firm—Armstrong, Nikaido, Marmelstein, Kubovcik & Murray

[57] ABSTRACT

A flywheel assembly including a first flywheel fastened to an engine crank shaft and engaged and disengaged by a clutch disc, a second flywheel supported concentrically with the first flywheel and set to a specified mass, and a friction damping mechanism which connects an inertial mass of the second flywheel to the clutch disc and damps a torsional vibration of the drive-transmission system only when the clutch disc contacts with the first flywheel.

3 Claims, 9 Drawing Sheets

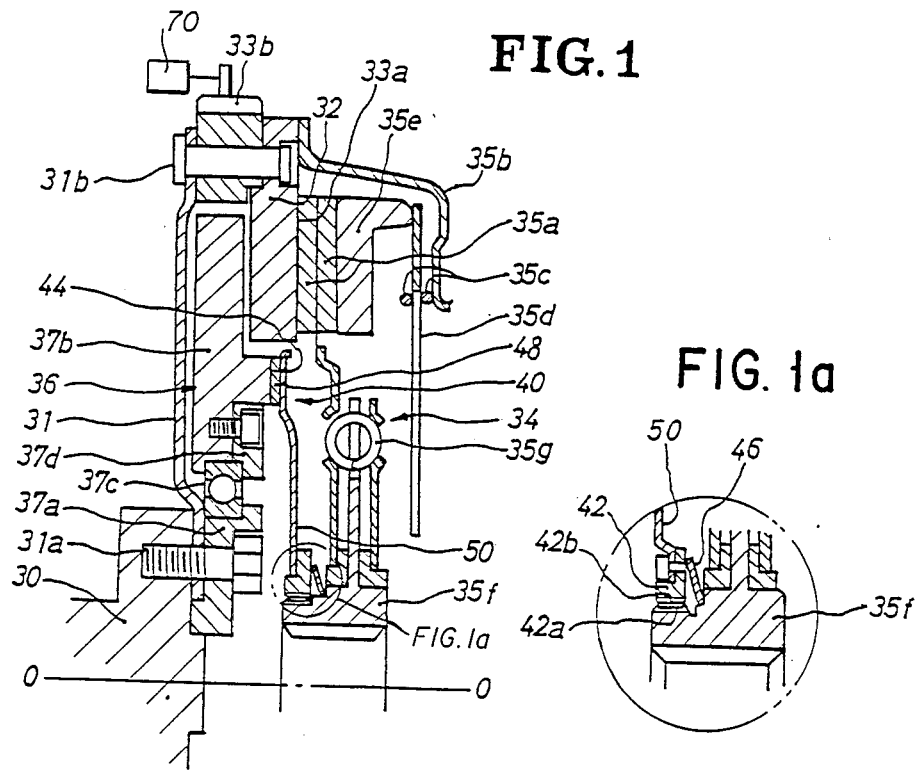
FIG. 1
FIG. 1a
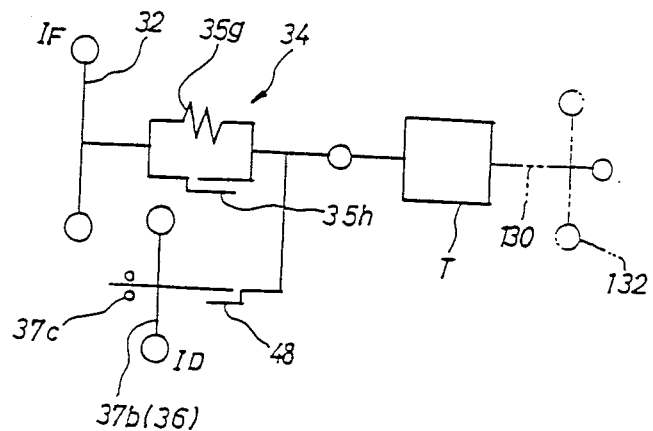
FIG. 2

FLYWHEEL ASSEMBLY

This is a division, of application No. 008,224 filed Jan. 29, 1987

BACKGROUND OF THE INVENTION 1. (Industrial useful field)

This invention relates to a flywheel assembly which absorbs vibration of input power.

2. (Prior art and its problem)

In FIG. 9 which is a schematic structural diagram of a conventional clutch disc, 10 is an engine input side and 12 is an output side from which a power is transmitted to a transmission, for example. A first-stage torsion spring 14a, a second-stage torsion spring 14b and a third-stage torsion spring 14c are interposed between the input side 10 and the output side 12, and specified torsion angle plays 14d & 14e are provided to the second-stage torsion spring 14b and the third-stage torsion spring 14c. Further, a first-stage hysteresis torque generating mechanism 16a, a second-stage hysteresis torque generating mechanism 16b and a third-stage hysteresis torque generating mechanism 16c are interposed therebetween in the same manner, and plays 16d & 16e are provided to the second-stage hysteresis torque generating mechanism 16b and the third-stage hysteresis torque generating mechanism 16c, respectively.

In the above-mentioned conventional embodiment, a torsion characteristic changes from a first-stage torsion characteristic Kd1 and a first-stage hysteresis characteristic Th1 which are both generated by the first-stage torsion spring 14a together with the first-stage hysteresis torque generating mechanism 16a, to a third-stage torsion characteristic Kd3 and a third-stage hysteresis characteristic Th3 which are both generated by third-stage torsion spring 14c together with the third-stage hysteresis torque generating mechanism 16c, with an increase in a torsion angle as shown by FIG. 10. However, this characteristic has the following disadvantage.

Namely, it is desired to set the first-stage torsion characteristic Kd1 ~ third-stage torsion characteristic Kd3 to small values as a countermeasure against noises, such as, gear chattering generated from a transmission in its neutral position and gear chatterings generated from the transmission and a differential gear in their driving position. On the contrary, however, it is necessary to set the first-stage torsion characteristic Kd1 ~ third-stage torsion characteristic Kd3 to large values as a counter-measure against low frequency vibrations.

Accordingly, the torsion characteristic of FIG. 10 is set up separately according to a characteristic required to each vehicle. Further, because requirement for noise and vibration control by clutch has become increasingly higher in recent years, often characteristics which can not be dealt with by conventional clutch structure, are required for example, conflicting countermeasures against noise and low frequency are required simultaneously, as mentioned above.

Therefore, technologies have been developed where vibrations from engine are positively absorbed even by the flywheel.

There are prior arts, us shown by FIG. 11 for example, where an auxiliary flywheel 26a and a damper 26b are interposed in series between a conventional clutch disc 20, a flywheel 22 and a crank shaft 24. The auxiliary flywheel 26a is installed in parallel with the flywheel 22 through a torsion spring as shown by FIG. 12.

With regard to such a flywheel assembly, the applicant of the present invention has developed a flywheel assembly as shown in FIG. 13 and has filed applications thereon, as hereinafter listed. Such flywheel assembly for patent, includes a first flywheel 104 fastened to an engine crank shaft 100 and engaged and disengaged by a clutch disc 102, a second flywheel 106 installed concentrically with the first flywheel and set to a specified mass, a damper mechanism 108 resiliently coupling the both flywheels, and a friction damping mechanism 112 which transmits an output from the second flywheel 106 to a spline hub 110 of the clutch disc 102 and damps its vibration only when said clutch disc 102 contacts with the first flywheel 104. (Japanese Patent Application No. 60-44298, U.S. Pat. Application Ser. No. 836,365, West German Patent Application No. 36 07 398.9, French Patent Application No. 8603211, Korean Patent Application No. 86/1451). The flywheel assembly of such patent application is further improved in the invention of the present application. an inertial damper, set to a specified mass may be connected to a propeller shaft to damp a torsional vibration of a so-called drive-transmission system from an engine output shaft to a driven wheel of automobile. In the present invention the torsional vibration of the drive-transmission system are dampened by a flywheel assembly rather than an inertral damper. In the flywheel assembly of my aforementioned application, as shown in FIG. 13 a facing 116 of a friction damping mechanism 112 is connected to a bolt 118 of the second flywheel 106 so that it becomes necessary to form a hole 120 on the first flywheel 104 and a working range of the friction damping mechanism 112 is limited to the area of the hole 120.

Further, in case when a power of a starter motor is inputted from a ring gear 122 of the first flywheel 104 at the time of starting the engine, the power is transmitted through the damper mechanism 108 to a crank shaft; so that it is necessary to determine a spring characteristic of the damper mechanism 108 in accordance with a load of the starter motor to cause a small degree of freedom of design.

Moreover, in the third place, a disc spring 114 of the friction damping mechanism 112 is installed on the spline hub 110 and a connecting plate 119 which connects the facing 116 to the spline hub 110 The structure of the clutch disc 102 becomes complicated. Furthermore, the facing 116 is also fixed to the bolt 118 of the second flywheel 106 side, so that the flywheel assembly and the clutch disc 102 are required to be completely disassembled when the worn-out facing 116 is replaced with a new one and the replacement is difficult.

OBJECT OF THE INVENTION

A general object of the present invention is to further improve the flywheel assembly in many aspects, and in which the flywheel is divided into two blocks and the friction damping mechanism absorbing vibration is installed.

An object of the invention is to provide a flywheel assembly which can damp a torsional vibration of a drive-transmission system by utilizing a part of a flywheel mass.

Another detailed object of the invention is to provide a flywheel assembly which effectively absorbs the vibration from engine and at the same time simplifies the structure of the clutch disc, and requires only easy maintenance.

A further detailed object of the invention is to provide a flywheel assembly which enlarges a working range of the friction damping mechanism and, at the same time, eases design of the damper mechanism.

A still further object of the invention is to provide a flywheel assembly which effectively absorbs the vibration from engine and at the same time simplifies the structure of the clutch disc, and requires only easy maintenance.

COMPOSITION OF THE INVENTION (1) Technical measure

A flywheel assembly including a first flywheel fastened to an engine crank shaft and engaged and disengaged by a clutch disc, a second flywheel supported concentrically with the first flywheel and set to a specified mass, and a friction damping mechanism which connects an inertial mass of the second flywheel to a spline hub of the clutch disc and damps a torsional vibration of the drive-transmission system only when the clutch disc contacts with the first flywheel.

(2) Function

The flywheel assembly accomplishes the abovementioned objects while connecting the friction damping mechanism to a part of the clutch disc.

BRIEF DESCRIPTION OF THE DRAWINGS

FIG. 1 is a vertical sectional view of a clutch applied with a first embodiment of the invention. FIG. 1a is an enlarged view of the portion of FIG. 1 circled. FIG. 2 is a structural skeleton diagram schematizing a structure of FIG. 1. FIG. 3c is an enlarged view of the portion of FIG. 3 circled. FIG. 4 is a partially sectional view taken on a line a —a of FIG. 4.

DETAILED DESCRIPTION OF THE INVENTION (Embodiments)

(1)

Figure 3:
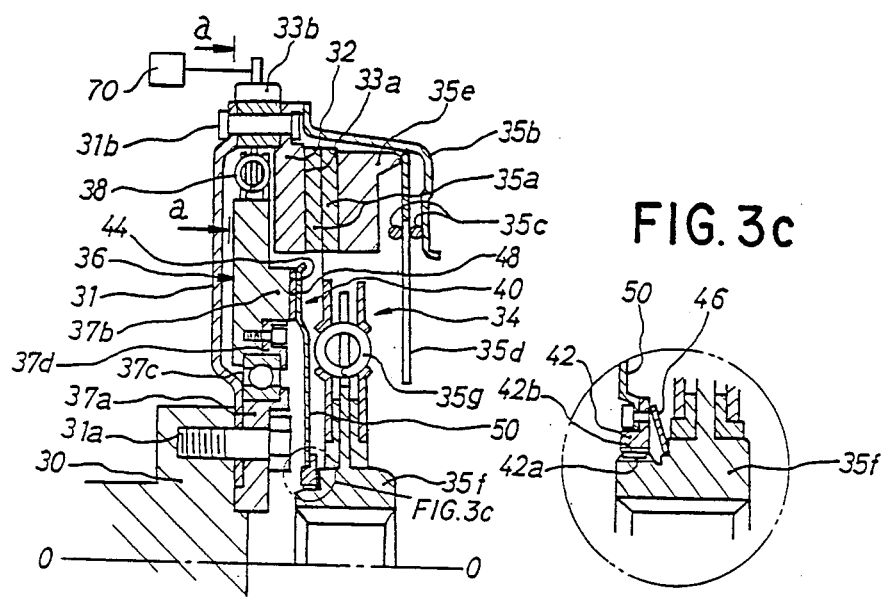
FIG. 3 is a vertical sectional partial view of a clutch applied with a second embodiment of the invention.

A first embodiment of the invention is a flywheel assembly including a first flywheel fastened to an engine crank shaft and engaged and disengaged by a clutch disc, a second flywheel supported concentrically with the first flywheel and set to a specified mass, and a friction damping mechanism which connects an inertial mass of the second flywheel to a spline hub of the clutch disc and damps a torsinal vibration of the drive-transmission system only when the clutch disc contacts with the first flywheel; characterized by that an outer peripheral part of said first flywheel and the crank shaft are connected by a comparatively thin connecting plate disposed along an end face of the second flywheel opposite to the disc clutch, a bearing is installed which supports the damper inertial part of the second flywheel relatively to an inner periphral flange of the second flywheel in a circumferentially rockable manner, a pressure surface on which a friction member of the friction damping mechanism presses is formed on the damper inertial part, the friction member being fixed to approximately annular friction plate provided on the spline hub of the clutch disc in an axially sliding manner, and a spring member urging the friction plate and the friction member toward the second flywheel is interposed between the friction plate and the spline hub.

The above-mentioned flywheel assembly of the first embodiment functions as follows:

The damper inertial part of the second flywheel is connected through the friction damping mechanism to the drive-transmission system and damps the torsional vibration of this drive-transmission system only when the clutch disc is pressed on the first flywheel.

A clutch according to the first embodiment will be described hereunder with reference to FIG. 1.

In FIG. 1, 30 is an engine crank shaft. A first flywheel 32 is fixed to a rear end of the crank shaft by means of a comparatively thin connecting plate 31 which will be described later in details. A facing 35a of the clutch disc 34 is adapted to contact with an annular surface 33a of the first flywheel 32. A ring gear 33b is formed on a radially outer peripheral part of the first flywheel 32, and a power of well-known starter motor 70 is inputted from this ring gear 33b. Further, the connecting plate 31 and the first flywheel 32 ar fastened together by rivets 31b disposed at eight places, for example, in a circumferential direction.

A clutch cover 35b is fastened to a rear end face of the first flywheel 32, and a pressure plate 35e is held to the clutch cover 35b through a wire ring 35c and a diaphragm spring 35d.

The first flywheel 32 is formed into an approximately disc-like shape, and a second flywheel 36 is installed at a front of the first flywheel 32 rotatably and concentrically with the first flywheel 32.

The second flywheel 36 is formed into an approximately annular shape is supported on a bearing 37c on a flange 37a at its inner peripheral part and has a damper inertial part 37b at its outer peripheral part, set to a specified mass adapted to an inertial mass of the drive-transmission system such as a transmission (not shown) etc. connected to a rear stage of the clutch.

Bearing 37c is interposed between the flange 37a and the inertial part 37b, and the damper inertial part 37b is supported by the ball bearing 37c relatively to the flange 37a in a rotatable manner. The flange 37a is fastened by a bolt 31a to the crank shaft 30 together with an inner peripheral part of the connecting plate 31 disposed along a front end face of the second flywheel 36. 37d in FIG. 1 is a bearing holder.

As shown in FIG. 1, a friction damping mechanism 40 is interposed between second flywheel 36 and a spline hub 35f of the clutch disc 34, the friction damping mechanism 40 is adapted to damp a torsional vibration generated from the drive-transmission system in a clutch engaged state where the facing 35a is pressed on the pressure surface 33a of the first flywheel 32.

The friction damping mechanism 40 is composed of a coned disc spring 46 (spring member), a facing 48 (friction member) and a friction plate 50 etc. The friction plate 50 is made of an approximately annular thin plate. An inner peripheral part of the friction plate 50 is fastened to a hub 42. A spline internal tooth 42a of the hub 42 meshes with a spline external tooth 42b of a spline hub 35f in an axially sliding manner. The coned disc spring 46 is interposed between the hub 42 and the spline hub 35f. The spring force of the coned disc spring 46 urges the friction plate 50 and the facing 48 toward a front side.

The facing 48 is bonded to an outer peripheral front face of the friction plate 50. The facing 48 slidingly contacts with a pressure surface 44 of the damper inertial part 37a of the second flywheel 36. The pressure surface 44 is formed into an annular shape consecutive in a circumferential direction of the second flywheel 36.

As shown in FIG. 2 the diagram of schematizing the foregoing clutch structure, the clutch disc 34 and the damper inertial part 37b (inertial mass: $I_D$) of the second flywheel 36 are disposed in parallel at a rear-stage of the first flywheel 32 (inertial mass: $I_F$). The damper inertial part 37b is supported by the bearing 37c separately from the first flywheel 32.

Further, a torsion spring 35g is equipped in parallel with a hysteresis generating mechanism 35h to the clutch disc 34. The facing 48 for generating a hysteresis torque is installed in series with the second flywheel 36.

Function will be described hereunder. In the clutch engaging state where the facing 35a is pressed on the annular surface 33a of the first flywheel 32 by the pressure plate 35e, a spring force of the diaphragm spring 35d urges the clutch disc 34 to slide on a spline shaft of a transmission (not shown) toward the first flywheel 32, and the friction plate 50 presses on the facing 48. In this instance, the coned disc spring 46 deforms itself due to a pressing force from the friction plate 50 and the friction plate 50 and the facing 48 are always pressed together by a constant pressure, so that a friction force generated between the facing 48 and the friction plate 50 is always kept constant.

In the above clutch engaging state, the engine power inputted in the first flywheel 32 is transmitted through the clutch disc 34 to the transmission and at the same time the inertial mass $I_D$ of the damper inertial part 37b of the second flywheel 36 is connected through the facing 48 and the friction plate 50 to the drive-transmission system such as the transmission T.

Accordingly, the torsional vibration generated in the drive-transmission system is damped by the damper inertial part 37b of the second flywheel, so that it is not required to install an inertial damper 132 in a propeller shift 130, for example, at a rear-stage of the transmission T. Therefore, it becomes unnecessary to provide an excessive mass of the damper 132 in the drive-transmission system so that an inertial mass of the overall drive-transmission system can be decreased.

Further, because the damper inertial part 37b is disposed at a front-stage of the transmission T, a torsional vibration damping effect of the damper inertial part 37b is not affected by a reduction ratio of the transmission T and inertial part 37b exerts it performance stably under a constant condition.

Because the connecting plate 31 has a comparatively thin wall, a bending vibration of the first flywheel 32 generated around an axis perpendicular to an axis O when the clutch disc 34 is engaged with or disengaged from the first flywheel 32, is absorbed by the elasticity of connecting plate 31.

At the time of starting the engine, the power from starter motor 70 is inputted in ring gear 33b of first flywheel 32, and this power is further transmitted from the ring gear 33b through the connecting plate 31 directly to the crank shaft 30.

When it is necessary to replaced clutch disc 34 due to wear of the facings 35a & 48 after a long period of use, the friction plate 50 and the facing 48 are replaced together with the clutch disc 34. Therefore, all consuming parts of the friction damping mechanism are installed at the clutch disc 34 side so that the first flywheel 32 side and the second flywheel 36 side are not required to be disassembled.

(Effect)

As described above, in the first embodiment, the flywheel assembly including the first flywheel 32 is fastened to the engine crank shaft 30 and is engaged and by the clutch disc 34, the second flywheel 36 is supported concentrically with the first flywheel 32 and set to the specified mass. The friction damping mechanism 40 connects the inertial mass $I_D$ of the damper inertial part 37b of the second flywheel 36 to the spline hub 35f of the clutch disc 34 and damps the torsional vibration of the drive-transmission system only when the clutch disc 34 contacts with the first flywheel 32; the outer peripheral part of the first flywheel 32 and the crank shaft 30 are connected by the comparatively thin connecting plate 31 disposed along the end face of the second flywheel 36 opposite to the disc clutch, the bearing 37c supports the damper inertial part 37b of the second flywheel 36 relatively to the inner peripheral flange 37a of the second flywheel 36 in the circumferentially rockable manner. The pressure surface 44 on which the facing 48 of the friction damping mechanism 40 presses is formed on the damper inertial part 37b. The facing 48 is fixed to the approximately annular friction plate 50 provided on the spline hub 35f of the clutch disc 34 in the axially sliding manner. The coned disc spring 46 (spring member) urging the friction plate 50 and the facing 48 toward the second flywheel is interposed between the friction plate 50 and the spline hub 35f. Therefore, the following advantages are obtained. The torsional vibration generated in the drive-transmission system is damped in the damper inertial part 37b of the second flywheel so that it is not necessary to install an inertial damper in the propeller shaft, for example, at the rear-stage of the transmission T, as with the conventional flywheel For this reason, it becomes unnecessary to provide the excessive mass of the damper in the drive-transmission system so that the inertial mass of the overall drive-transmission system can be decreased.

Disposed at the front-stage of the transmission T, the torsional vibration damping effect of the damper inertial part 37b is not affected by the reduction ratio of the transmission and the inertial part 37b always exerts said torsional vibration damping effect.

The friction, as stated in this specification, means all friction phenomena such as dry friction, viscous friction etc.

(2) Second embodiment

The second embodiment of the invention includes a flywheel assembly having a first flywheel fastened to an engine crank shaft and engaged and disengaged by a clutch disc, a second flywheel supported concentrically with the first flywheel and set to a specified mass, a damper mechanism which connects the both flywheels resiliently, and a friction damping mechanism which transmits an output from the second flywheel to a spline hub of the clutch disc and damps a torsional vibration of the drive-transmission system only when said clutch disc contacts with the first flywheel; An outer peripheral part of the first flywheel and the crank shaft are connected by a comparatively thin connecting plate disposed along an end face of the second flywheel opposite to the disc clutch. A bearing is installed which supports a damper inertial part of the second flywheel relatively to an inner peripheral flange of the second flywheel in a circumferentially rockable manner. A pressure surface, on which a friction member of the friction damping mechanism presses, is formed on the damper inertial part. The friction member is fixed to an approximately annular friction plate provided on the spline hub of the clutch disc in an axially sliding manner. A spring member urges the friction plate and the friction member toward the second flywheel and is interposed between the friction plate and the spline hub.

The above-mentioned flywheel assembly of the second embodiment functions as follows:

The first flywheel is connected to the crank shaft by the connecting plate so that the conventional hole for passing the bolt through the first flywheel become unnecessary. The friction damping mechanism works in a wide range of torsion angle.

The power of starter motor inputted in the first flywheel is transmitted directly from the connecting plate to the crank shaft.

A clutch according to the second embodiment will be described with reference to FIG. 3.

In FIG. 3, 30 is an engine crank shaft. A first flywheel 32 is fixed to a rear end of the crank shaft by means of a comparatively thin connecting plate 31 which will be described later in details. A facing 35a of the clutch disc 34 is adapted to contact with an annular surface 33a of the first flywheel 32. A ring gear 33b is formed on a radially outer peripheral part of the first flywheel 32, and a power of well-known starter motor 70 is inputted from this ring gear 33b. Further, the connecting plate 31 and the first flywheel 32 are fastened together by rivets 31b disposed at eight places, for example, in a circumferential direction.

A clutch cover 35b is fastened to a rear end face of the first flywheel 32, and a pressure plate 53e is held to the clutch cover 35b through a wire ring 35c and a diaphragm spring 35d.

The first flywheel 32 is formed into an approximately disc-like shape, and a second flywheel 36 is installed at a front of the first flywheel 32 rotatably and concentrically with the first flywheel 32.

The second flywheel 36 is formed into an approximately annular shape is supported on a flange 37a at its inner peripheral part. A damper inertial part 37b is at the outer peripheral part, of flywheel 36 and is set to a specified mass adapted to an inertial mass of the drive-transmission system such as a transmission (not shown) etc. connected to a rear stage of the clutch. A ball bearing 37c is interposed between the flange 37a and the inertial part 37b. The damper inertial part 37b is supported by the ball bearing 37c relatively to the flange 37a in a rotating manner. The flange 37a is fastened by a bolt 31a to the crank shaft 30 together with an inner peripheral part of the connecting plate 31 disposed along a front end face of the second flywheel 36. 37d in FIG. 3 is a bearing holder.

A torsion spring 38 (damper mechanism) is compressively installed between an outer peripheral part of the second flywheel 36 and the first flywheel 32 to resiliently connect the first flywheel 32 to the second flywheel 36 as described later in details.

Figure 3A:
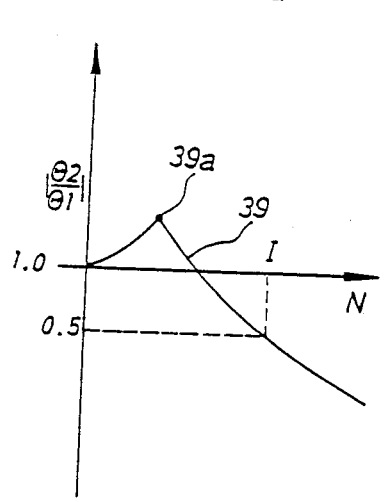
FIG. 3a is a graph showing a damping characteristic.

A spring constant of the torsion spring 38 is so determined that a resonance point 39a of a characteristic 39 representing a relation between a value $|\theta\dot{\theta}|$ shown in FIG. 3a and an engine rotation N is generated at a rotation region lower than an idle rotation I, supposing that a change in angular velocity of the first flywheel is $\theta$ and a change in velocity of the clutch disc spline hub 35f is $\dot{\theta}$.

Accordingly, at a normal rotation region higher than the idle rotation I, the value $|\theta\dot{\theta}|$ decreases with an increase in the rotation and the change in angular velocity $\dot{\theta}$ of the clutch disc spline hub 35f or a rotational fluctuation of the transmission etc. is practically very small.

Figure 4A:
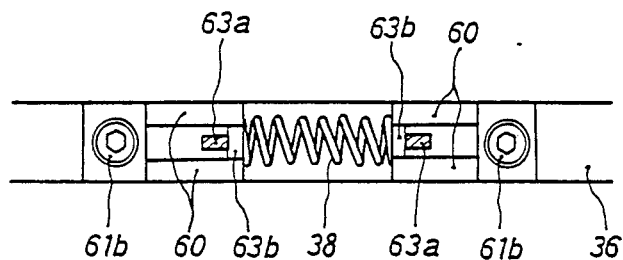
FIG. 4 is a vertical sectional view taken on a line a—a of FIG. 3.
FIG. 4b is a sectional view taken on a line b—b of FIG. 4.
Figure 4:
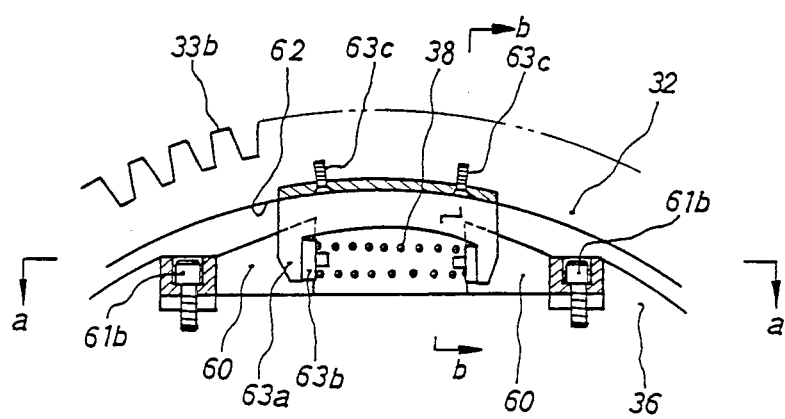

The torsion spring 38 is installed between a bracket 60 of the second flywheel 36 and an inner peripheral wall 62 of the first flywheel 32 as shown in FIG. 4. Spring holders 63a are installed at six places, for example, on the inner peripheral wall 62 with equal distances left therebetween in a circumferential direction of the first flywheel 32.

Figure 4B:
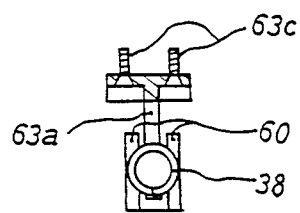

The torsion spring 38 is compressively installed between the spring holder 63a and the bracket 60 through the spring seats 63b. The bracket 60 is fastened by a bolt 61b to an outer peripheral edge of the second flywheel 36 (FIG. 4a) and the spring holder 63a is fastened by a screw 63c to the first flywheel 32 (FIG. 4b).

The friction damping mechanism 40 is interposed between the second flywheel 36 and the spline hub 35f of the clutch disc 34 as illustrated in FIG. 3, and the friction damping mechanism 40 is adapted to damp vibrations which are transmitted to the first flywheel 32 when the facing 35a contacts with the pressure surface 33a of the first flywheel 32.

The friction damping mechanism 40 is composed of a coned disc spring 46 (spring member), a facing 48 (friction member) and a friction plate 50 etc. The friction plate 50 is made of an approximately thin plate, and an inner peripheral part of the friction plate 50 is fastened to a hub 42. A spline internal tooth 42a of the hub 42 meshes with a spline external tooth 42b of a spline hub 35f in an axially sliding manner. The coned disc spring 46 is interposed between the hub 42 and the spline hub 35f, and a spring force of the coned disc spring 46 urges the friction plate 50 and the facing 48 toward a front side.

The facing 48 is bonded to an outer peripheral front face of the friction plate 50, and the facing 48 slidingly contacts with a pressure surface 44 of the damper inertial part 37a of the second flywheel 36. The pressure surface 44 is formed into an annular shape consecutive in a circumferential direction of the second flywheel 36.

Figure 3B:
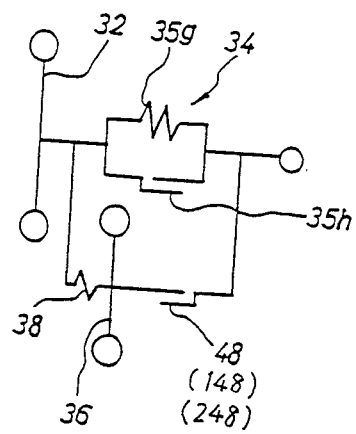
FIG. 3b is a structural skeleton diagram schematizing a structure of FIG. 3.

As shown in FIG. 3b showing the skeleton diagram schematizing the foregoing structure of clutch, the clutch disc 34 and the second flywheel 36 are disposed in parallel at a rear-stage of the first flywheel 32. A torsion spring 35g is equipped in parallel with a hysteresis generating mechanism 35h to the clutch disc 34. The torsion spring 38 and the facing 48 for generating a hysteresis torque is installed in series with the second flywheel 36.

Function will be described hereunder. In the clutch engaging state where the facing 35a is pressed on the annular surface 33a of the first flywheel 32 by the pressure plate 35e, a spring force of the diaphragm spring 35d urges the clutch disc 34 to slide on a spline shaft of a transmission (not shown) toward the first flywheel 32, and the friction plate 50 presses on the facing 48. In this instance, the coned disc spring 46 deforms itself due to a pressing force from the friction plate 50 and the friction plate 50 and the facing 48 are always pressed together by a constant pressure, so that a friction force generated between the facing 48 and the friction plate 50 is always kept constant.

In the above clutch engaging state, the engine power inputted in the first flywheel 32 is transmitted through two paths: a path through the clutch disc 34 and a path through the second flywheel 36, the facing 48 and the friction plate 50 to the transmission.

Accordingly, concerning a torque (average torque+-fluctuating torque) transmitted from the engine to the transmission, the fluctuating torque is absorbed by the facing 48 and the second flywheel 36 supported resiliently and floatingly by the torsion spring 38 and only the average torque is transmitted through the clutch disc 34 to the transmission, so that the engine rotational fluctuation and the torque fluctuation can be removed approximately completely.

Figure 13:
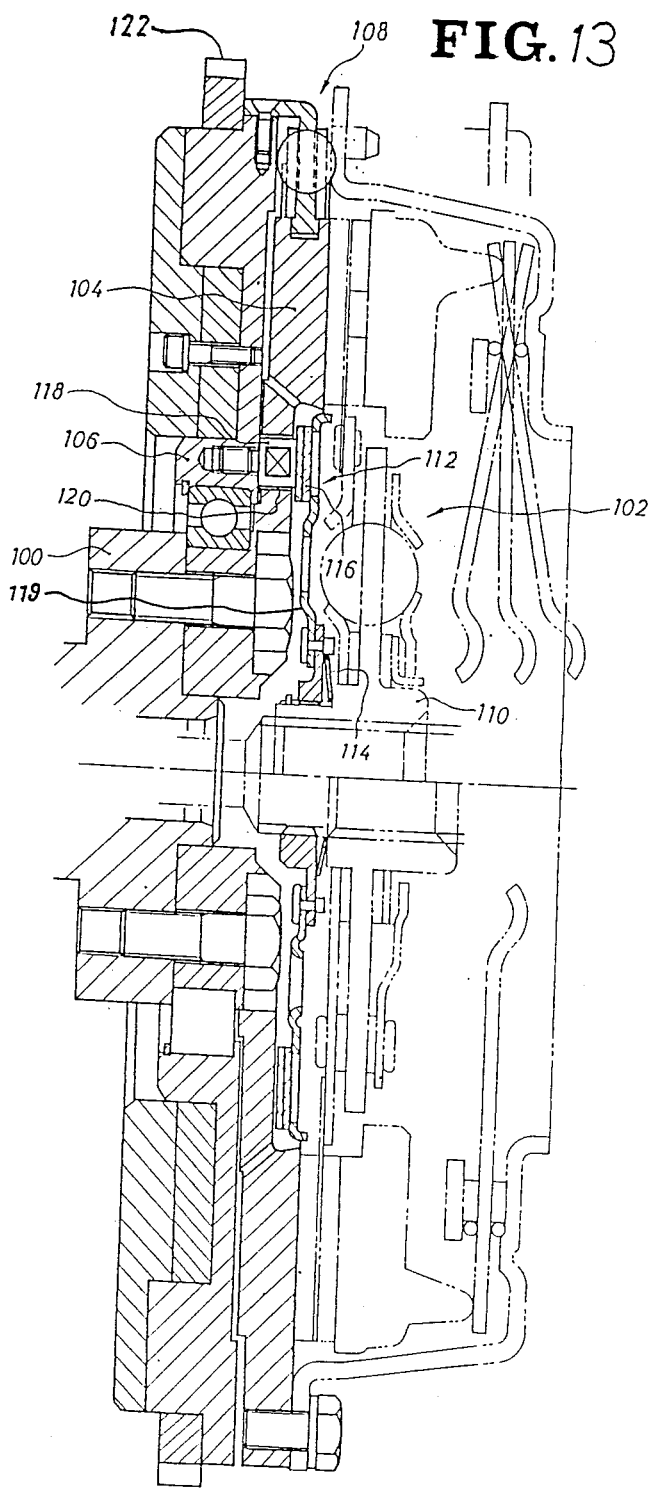
FIG. 13 is a vertical sectional view of the flywheel assembly of the prior U.S. Pat. Application

Since the facing 48 of the friction damping mechanism 40 pressingly contacts with the annular pressure surface 44 consecutive over the entire periphery of the second flywheel. 36, an opening range of a hole 120 is not limited as compared with the embodiment of my copending application shown in FIG. 13. The engine rotational fluctuation and the torque fluctuation can be controlled over a wide range of torsion angle.

Since the connecting plate 31 has the comparatively thin wall, the bending vibration of the first flywheel 32 which is generated around the axis perpendicular to the axis 0 when the clutch disc 34 is engaged with or disengaged from the first flywheel 32, can be absorbed by the elasticity of the connecting plate 31.

At the time of starting the engine, the power from said starter motor 70 is inputted in the ring gear 33b of the first flywheel 32. This power is further transmitted from the ring gear 33b through the connecting plate 31 directly to the crank shaft 30 and is not affected by the torsion spring 38 as in case of the conventional embodiment, so that it becomes unnecessary to design the spring characteristic of the torsion spring so as to transmit starting torque.

Moreover, when the entire clutch disc 34 is replaced due to worn-out of the facing 35a & 48 after a long period of use, the friction plate 50 and the facing 48 are also replaced together with the clutch disc 34. Therefore, all consuming parts of the friction damping mechanism are installed at the clutch disc 34 side so that the first flywheel 32 side and the second flywheel 36 side are not required to be disassembled.

(Effect)

As described above, in the flywheel assembly of the second embodiment the outer peripheral part of said first flywheel 32 and the crank shaft 30 are connected by the comparatively thin connecting plate 31 disposed along the end face of the second flywheel 36 opposite to the clutch disc. The bearing 37c is installed which supports the damper inertial part 37b of the second flywheel 36 relatively to the inner peripheral flange 37a of the second flywheel 36 in the circumferentially rockable manner. The pressure surface 44 on which the facing 48 of the friction damping mechanism 40 presses is formed on the damper inertial part 37b. The facing 48 is fixed to the approximately annular friction plate 50 provided on the spline hub 35f of the clutch disc 34 in the axially sliding manner. The coned disc spring 46 (spring member) urging the friction plate 50 and the facing 48 toward the second flywheel is interposed between the friction plate 50 and the spline hub 35f. Therefore, the following advantages become obtainable.

Because the facing 48 of the friction damping mechanism 40 pressingly contacts with the annular pressure surface 44 consecutive over the entire periphery of the second flywheel 36, an opening range of a hole 120 is not limited as compared with the embodiment of my copending application shown in FIG. 13. The engine rotational fluctuation and the torque fluctuation can be controlled over a wide range of torsion angle.

(3) Third embodiment

The flywheel assembly of the embodiment of the invention includes a first flywheel fastened to an engine crank shaft and engaged and disengaged by a clutch disc, a second flywheel supported concentrically with the first flywheel and set to a specified mass, a damper mechanism which connects the both flywheels resiliently, and a friction damping mechanism which transmits an output from the second flywheel to a spline hub of the clutch disc and damps a torsional vibration of the drive-transmission system only when said clutch disc contacts with the first flywheel; The friction member of the friction damping mechanism is fastened to a clutch plate of the clutch disc. This clutch plate and a sub-plate are fixed to the spline hub by a connecting pin. An annular plate concentric to a facing provided at a radially outer peripheral part of the clutch disc is installed between the clutch plate and the sub-plate and is freely slidingly in a circumferential direction. A torsion spring is interposed between the annular plate, the clutch plate and the sub-plate, and a spring member for the friction damping mechanism is connected to the second flywheel.

The above-mentioned flywheel assembly of the third embodiment functions as follows:

The spring member is installed at the second flywheel side and the friction member is fastened to the clutch plate of the clutch disc, so that the member connecting the friction member to the clutch disc becomes unnecessary. When the friction member is worn out, the friction member is to be replaced together with the clutch disc.

A clutch according to the third embodiment will be described hereunder with reference to FIG. 5.

Figure 5A:
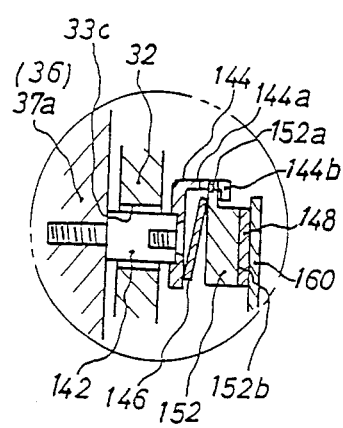
FIG. 5a is an enlarged view of the portion
Figure 5:
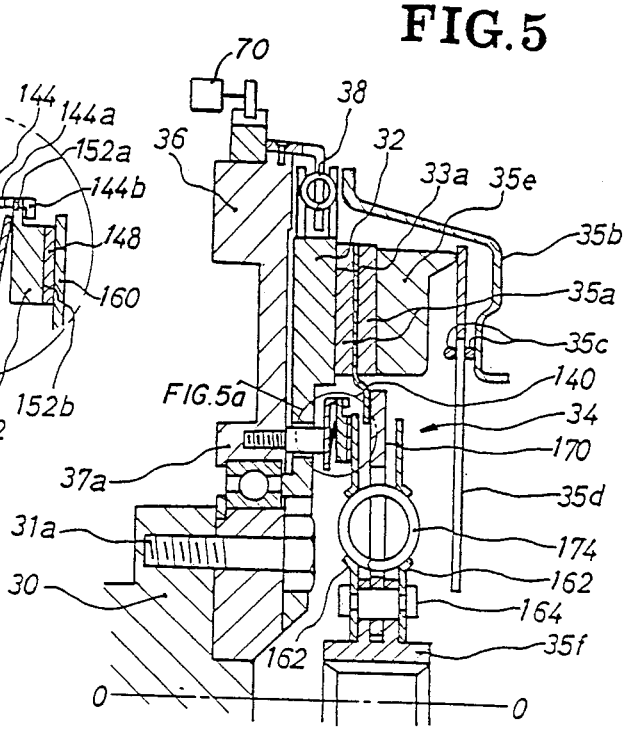
FIG. 5 is a vertical sectional partial view of a clutch applied with a third embodiment of the invention.

In FIG. 5, 30 is an engine crank shaft. A first flywheel 32 is fixed to a rear end of the crank shaft 30 by a bolt 31a. A facing 35a of the clutch disc 34 is adapted to contact with an annular surface 33a of the first flywheel 32. A clutch cover 35b is fastened to a rear end face of the first flywheel 32, and a pressure plate 35e is held to the clutch cover 35b through a wire ring 3c and a diaphragm spring 35d.

The first flywheel 32 is formed into an approximately disc-like shape, and a second flywheel 36 is installed at a front of the first flywheel 32 rotatably and concentrically with the first flywheel 32.

The second flywheel 36 is formed into an approximately annular shape having a flange 37a at its inner peripheral part and set to a specified mass adapted to an inertial mass of the drive-transmission system such as a transmission (not shown) etc. connected to a rear stage of the clutch.

A torsion spring 38 (damper mechanism) is compressively installed between an outer peripheral part of the second flywheel 36 and the first flywheel 32 to resiliently connect the first flywheel 32 to the second flywheel 36.

A spring constant of the torsion spring 38 is so determined that a resonance point 39a of a characteristic 39 representing a relation between a value $|\theta\theta|$ shown in FIG. 3a and an engine rotation N is generated at a rotation region lower than an idle rotation I, supposing that a change in angular velocity of the first flywheel is $\theta$ and a change in velocity of the clutch disc spline hub 35f is $\theta$.

Accordingly, at a normal rotation region higher than the idle rotation I, the value $|\theta\theta|$ decreases with an increase in the rotation change in angular velocity $\theta$ of the clutch disc spline hub 35f or a rotational fluctuation of the transmission etc. is practically very small.

A friction damping mechanism 140 is interposed between the second flywheel 36 and the spline hub 35f of the clutch disc 34. The friction damping mechanism 140 is adapted to damp vibrations which are transmitted to the first flywheel 32 when the facing 35a contacts with the pressure surface 33a of the first flywheel 32.

The friction damping mechanism 140 is composed of a bolt 142, a retaining ring 144, a coned disc spring 146 (spring member), a facing 148 (friction member), a friction plate 150 and an intermediate plate 152 etc. A threaded part 142a of the bolt 142 is screwed in a flange 37a of the second flywheel 36, and the bolt 142 pierces a hole 33c of the first flywheel 32. The retaining ring 144 fastened, for example, by a small screw etc. fits onto a rear end face of the bolt 142. The retaining ring 144 is formed into an approximately annular shape extending in the circumferential direction of the first flywheel 32 and second flywheel 36. Notches 144b are formed at plural places of an outer peripheral flange 144a of the retaining ring 144 with equal distances left therebetween in its circumferential direction. A claw 152a which is provided integrally on an outer peripheral face of said intermediate plate 152, fits in the notch 144b. The intermediate plate 152 is connected to the retaining ring 144 through the notch 144b. The claw 152a freely slide in the axial direction.

The coned disc spring 146 is interposed between the retaining ring 144 and the intermediate plate 152, and the coned disc spring 146 urges the intermediate plate 152 backward i.e. toward the first flywheel 32. The coned disc spring 146 is also formed into the annular shape extending in the circumferential direction of the first flywheel 32 and the second flywheel 36.

The facing 148 is disposed at opposite side to a pressure surface 152b of the intermediate plate 152. The facing 148 is fastened to a clutch plate 160 the clutch disc 34, which will be described later in details, by means of such as bonding.

Figure 6:
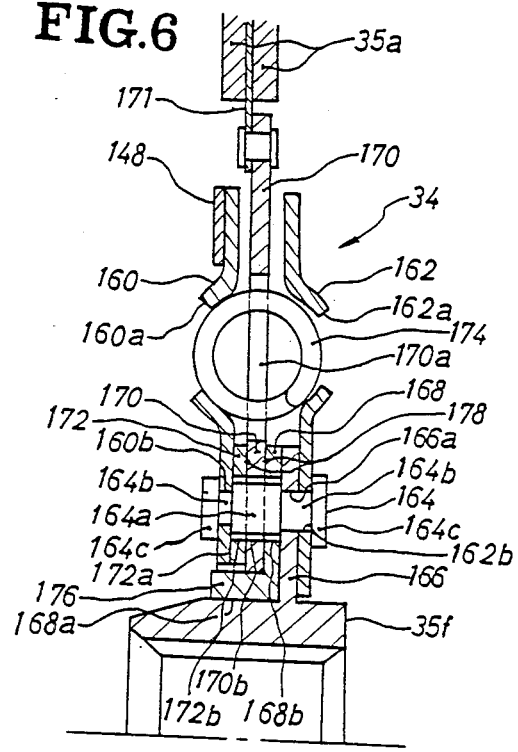
FIG. 6 is an enlarged view of the clutch disc of FIG. 5.
Figure 6A:
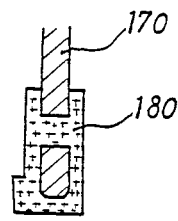
FIG. 6a is an essential vertical sectional view showing an alternate example of the third embodiment.

The clutch disc 34 is formed as shown by FIG. 6. The clutch plate 160 is formed into an approximately disc-like shape, and holes 160a are formed at four places, for example, in the circumferential direction. A sub-plate 162 is installed opposite to the clutch plate 160 with a specified distance left therebetween. A hole 162a is formed on the sub-plate 162. The clutch plate 160 and the sub-plate 162 are fixed to a flange 166 of the spline hub 35f at their radially inner peripheries by a connecting pin 164. The connecting pin 164 is disposed at eight places, for example, with equal distances left therebetween in the circumferential direction.

A large-dia. part 164a, small-dia. parts 164b and flanges 164c are formed on the connecting pin 164. The small-dia. part 164b at a right side of figure fits in and is fastened by "staking" to a hole 166a of the flange 166 and a hole 162b of the subplate 162. Further, the small-dia. part 164b at a left side of the connecting pin 164 is fixed to the hole 160b of the clutch plate 160 in the same manner.

An approximately annular first bush 168, an annular plate 170 and a second bush 172 are interposed in this order between the flange 166 and the clutch plate 160. The annular plate 170 connects to said facing 35a through a cushioning plate 171 at a radial outer peripheral part. In an ordinary clutch disc, the annular plate 170 is a member corresponding to the flange of the spline hub and is installed freely slidingly in relation to the clutch plate 160 and the sub-plate 162 within a specified torsion angle as described later in details.

A hole 170a is made on the annular plate 170, and a torsion spring 174 (coil spring) is compressively installed in the hole 170a, 160a, & 162a. Further, circular slotted holes 168b, 170b & 172b through which the large-dia. part 164a of the connecting pin 164 passes are made on inner peripheral parts of the first bush 168, the annular plate 170 and the second bush 172. These circular slotted holes 168b, 170b & 172b are formed into circular shapes over the torsion angle range of the annular plate 170, so that the annular plate 170 can slide freely in the circumferential direction within the range of the circular slotted holes 168b, 170b & 172b.

The first bush 168 and the second bush 172 are bonded to the annular plate 170 at bonding surfaces 178. Left side end face of the second bush 172 is a sliding contact face 172a. A section of the first bush 168 is bent in an approximately L-shape, and its inner peripheral surface 168a slidingly contacts with a sliding contact face 176 of the spline hub 35f.

As illustrated in FIG. 3b showing the skeleton diagram schematizing the foregoing structure of clutch, the clutch disc 34 and the second flywheel 36 are disposed in parallel at a rear-stage of the first flywheel 32. A torsion spring 35g is equipped in parallel with a hysteresis generating mechanism 35h to the clutch disc 34. The torsion spring 38 and the facing 148 for generating a hysteresis torque are installed in series with the second flywheel 36.

Function will be described hereunder. In the clutch engaging state where the facing 35a is pressed on the annular surface 33a of the first flywheel 32 by the pressure plate 35e, a spring force of the diaphragm spring 35d urges the clutch disc 34 to slide on a spline shaft of a transmission (not shown) toward the first flywheel 32, and the friction plate 150 presses on the facing 148. In this instance, the coned disc spring 146 deforms itself due to a pressing force from the friction plate 150 and the friction plate 150 and the facing 148 are always pressed together by a constant pressure, so that a friction force generated between the facing 148 and the friction plate 150 is always kept constant.

In the above clutch engaging state, the engine power inputted in the first flywheel 32 is transmitted through two paths: a path through the clutch disc 34 and a path through the second flywheel 36, the facing 148 and the friction plate 150 to the transmission.

Accordingly, concerning a torque (average torque +- fluctuating torque) transmitted from the engine to the transmission, the fluctuating torque is absorbed by the facing 148 and the second flywheel 36 supported resiliently and floatingly by the torsion spring 38. Only the average torque is transmitted through the clutch disc 34 to the transmission, so that the engine rotational fluctuation and the torque fluctuation can be removed approximately completely.

As compared with a clutch disc 102 illustrated in FIG. 13, the facing 148 is only fastened to the clutch plate 160 so that a structure of the clutch disc 34 is very simple.

Moreover, when the entire clutch disc 34 is replaced due to worn-out of the facings 35a & 148 after a long period of use, the facing 148 is also replaced together with the clutch disc 34. Therefore, all consuming parts of the friction damping mechanism 140 are installed at the clutch disc 34 side so that the first flywheel 32 side and the second flywheel 36 side are not required to be disassembled.

(Effect)

As described above, in the flywheel assembly of the third embodiment, the facing 148 (friction member) of the friction damping mechanism 140 is fastened to the clutch plate 160 of the clutch disc 34. This clutch plate 160 and the sub-plate 162 are fixed to the spline hub 35f by the connecting pin 164. The annular plate 170 concentric to the facing 148 provided at the radially outer peripheral part of the clutch disc 34 is installed between the clutch plate 160 and the sub-plate 162 freely slidingly in the circumferential direction. The torsion spring 174 is interposed between the annular plate 170, the clutch plate 160 and the sub-plate 162, and the coned disc spring 146 (spring member) for the friction damping mechanism 140 is connected to the second flywheel 36. Therefore, the connecting plate 120 of FIG. 13 can be eliminated and the structure of the clutch disc 34 can be simplified.

Further, when the entire clutch disc 34 is replaced due to worn-out of the facings 35a & 148 after a long period of use, the facing 148 is also replaced together with the clutch disc 34. Therefore, all consuming parts of the friction damping mechanism 140 are installed at the clutch disc 34 side so that the first flywheel 32 side nd the second flywheel 36 side are not to be disassembled and its maintenance becomes easy.

(Alternate of the third embodiment)

(1) The first bush 168 and the second bush 172 are not necessarily constructed as shown by FIG. 6, but may be an integrally molded article 180 made of a material such as plastic etc., for example, having a low friction coefficient, which is molded integrally with an inner peripheral part of the annular plate 170.

(2) Further, the flange 166 is not necessarily be disposed at the inner peripheral parts of the clutch plate 160 and the sub-plate 162, but may be disposed at their outer peripheral parts. In this instance, the facing 148 is to be bonded to the inner peripheral part of the clutch plate 160.

(4) Fourth embodiment

The flywheel assembly of the fourth embodiment of the invention includes a first flywheel fastened to an engine crank shaft and engaged and disengaged by a clutch disc, a second flywheel supported concentrically with the first flywheel and set to a specified mass, a damper mechanism which connects the both flywheels resiliently, and a friction damping mechanism which transmits an output from the second flywheel to a spline hub of the clutch disc and damps a torsional vibration of the drive-transmission system only when said clutch disc contacts with the first flywheel. A spring member of the friction damping mechanism is formed into an approximately annular shape connected to a radially intermediate part of the first flywheel. An approximately annular intermediate plate pressing on the spring member is provided in such a manner as freely engaged with or disengaged from the friction member. The friction member is connected to the clutch disc through a friction plate.

The above-mentioned flywheel assembly of the fourth embodiment functions as follows:

The spring member is installed on the second flywheel side and the friction member is installed on the clutch disc side, so that the friction member is to be replaced together with the clutch disc when the friction member is worn out.

Since the friction plate connecting the friction member to the clutch disc is fastened to the clutch disc, the structure of the clutch disc becomes simple.

Figure 7:
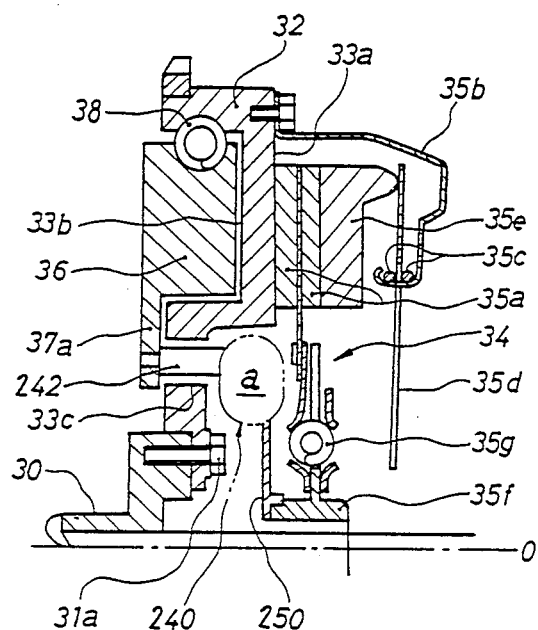
FIG. 7 is a vertical sectional partial view of a clutch applied with a fourth embodiment of the invention.

A clutch according to the fourth embodiment is described hereunder with reference to FIG. 7.

In FIG. 7, 30 is an engine crank shaft. A first flywheel 32 is fixed to a rear end of the crank shaft 30 by a bolt 31a. A facing 35a of the clutch disc 34 is adapted to contact with an annular surface 33a of the first flywheel 32. A clutch cover 35b is fastened to a rear end face of the first flywheel 32, and a pressure plate 53e is held to the clutch cover 35b through a wire ring 35c and a diaphragm spring 35d.

The first flywheel 32 is formed into an approximately disc-like shape, and an annular groove 33b is formed at a front outer peripheral part of the first flywheel 32. The second flywheel 36 is installed in the annular groove 33b freely rotatably and concentrically with the first flywheel 32.

The second flywheel 36 is formed into an approximately annular shape having a flange 37a at its inner peripheral part, and set to a specified mass adapted to an inertial mass of the drive-transmission system such as a transmission (not shown) etc. connected to a rear stage of the clutch.

A torsion spring 38 (damper mechanism) is compressively installed between an outer peripheral part of the second flywheel 36 and an inner peripheral part of the first flywheel 32 to resiliently connect the first flywheel 32 to the second flywheel 36.

A spring constant of the torsion spring 38 is so determined that a resonance point 39a of a characteristic 39 representing a relation between a value $|\theta\theta|$ shown in FIG. 3a and an engine rotation N is generated at a rotation region lower than an idle rotation I, supposing that a change in angular velocity of the first flywheel is $\theta$ and a change in velocity of the clutch disc spline hub 35f is $\theta$.

Accordingly, at a normal rotation region higher than the idle rotation I, the value $|\theta\theta|$ decreases with an increase in the rotation and the change in angular velocity $\theta$ of the clutch disc spline hub 35f or a rotational fluctuation of the transmission etc. is practically very small.

A friction damping mechanism 240 is interposed between the second flywheel 36 and the spline hub 35f of the clutch disc 34, and adapted to damp vibrations which are transmitted to the first flywheel 32 when the facing 35a contacts with the pressure surface 33a of the first flywheel 32.

Figure 8:
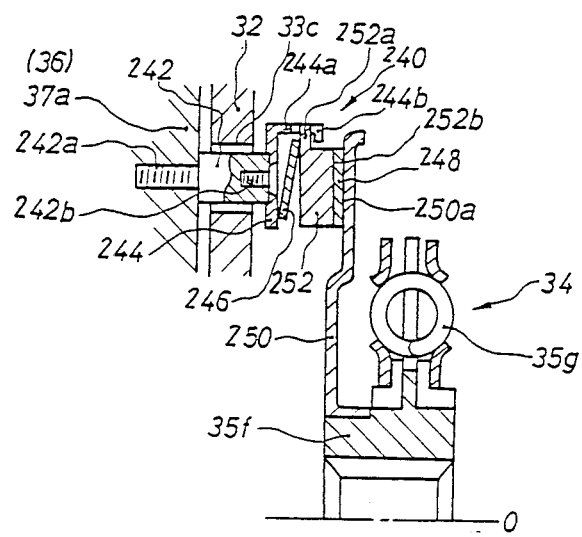
FIG. 8 is an enlarged view of a-part of FIG. 7.
Figure 9:
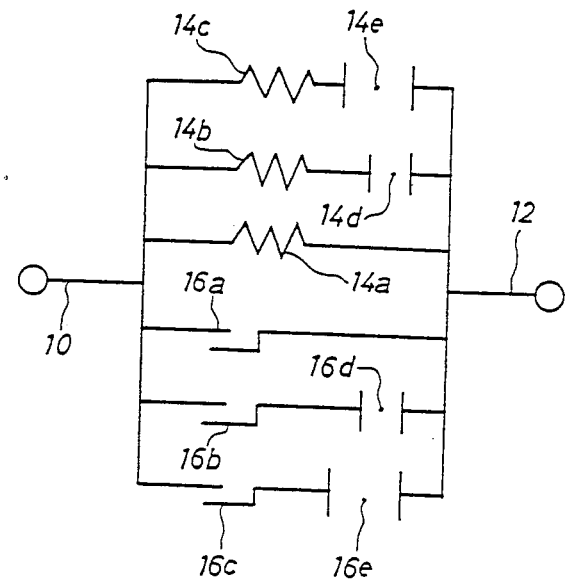
FIG. 9 is a structural skelton diagram showing a conventional embodiment.
Figure 10:
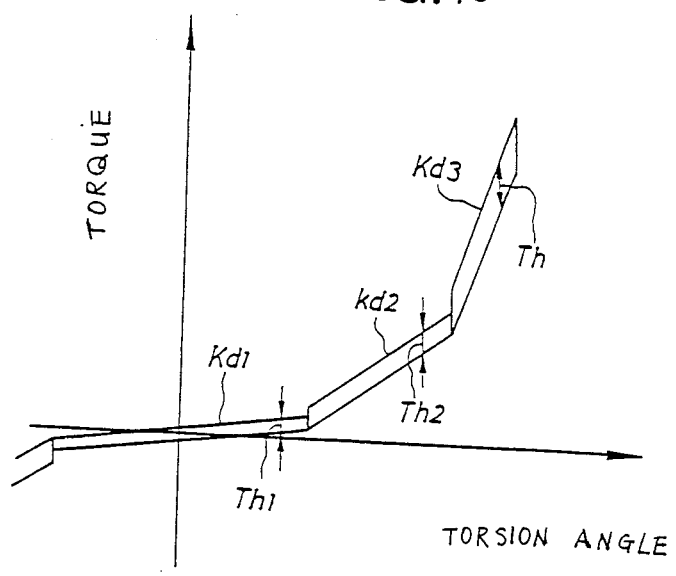
FIG. 10 is a graph showing a torsion characteristic of the conventional embodiment of FIG. 9.
Figure 11:
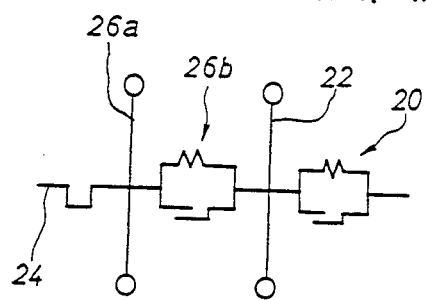
FIGS. 11 & 12 are structural skelton diagrams showing another embodiments.
Figure 12:
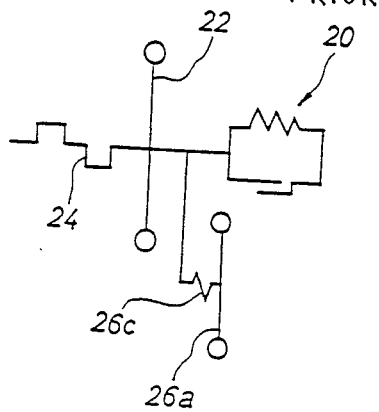

The friction damping mechanism 240 is compose of a bolt 242, a retaining ring 244, a coned disc spring 246 (spring member), a facing 248 (friction member), a friction plate 250 and an intermediate plate 252 etc. as shown by FIG. 8. A threaded part 242a of the bolt 242 is threaded in a flange 37a of the second flywheel 36, and the bolt 242 pierces a hole 33c of the first flywheel 32. The retaining ring 244 fastened, for example, by a small screw 242b fits onto a rear end face of the bolt 242. The retaining ring 244 is formed into an approximately annular shape extending in the circumferential direction of the first flywheel 32 and second flywheel 36. Notches 244b are formed at plural places of an outer peripheral flange 244a of the retaining ring 244 with equal distances left therebetween in its circumferential direction. A claw 252a which is provided integrally on an outer peripheral face of the intermediate plate 252, fits in the notch 244b. The intermediate plate 252 is connected to the retaining ring 244 through the notch 244b and the claw 252a freely slidingly in their axial direction.

The coned disc spring 246 is interposed between the retaining ring 244 and the intermediate plate 252, and urges the intermediate plate 252 backward i.e. toward the first flywheel 32. The coned disc spring 246 is also formed into the annular shape extending in the circumferential direction of the first flywheel 32 and the second flywheel 36.

The facing 248 is disposed at opposite side to a pressure surface 252b of the intermediate plate 252, and the facing 248 is bonded to an approximately annular disclike friction plate 250 through a bonding surface 250a. A radially inner peripheral part of the friction plate 250 is fastened by press-fit onto the spline hub 35f of the clutch disc 34.

As illustrated in FIG. 36 showing the skelton diagram schematizing the foregoing structure of clutch, the clutch disc 34 and the second flywheel 36 are disposed in parallel at a rear-stage of the first flywheel 32. A torsion spring 35g is equipped in parallel with a hysteresis generating mechanism 35h to the clutch disc 34. The torsion spring 38 and the facing 248 for generating a hysteresis torque are installed in series with the second flywheel 36.

Function will be described hereunder. In the clutch engaging state where the facing 35a is pressed on the annular surface 33a of the first. flywheel 32 by the pressure plate 35e, a spring force of the diaphragm spring 35d urges the clutch disc 34 to slide on a spline shaft of a transmission (not shown) toward the first flywheel 32, and the friction plate 250 presses on the facing 248. In this instance, the coned disc spring 246 deforms itself due to a pressing force from the friction plate 250 and the friction plate 250 and the facing 248 are always pressed together by a constant pressure, so that a friction force generated between the facing 248 and the friction plate 250 is always kept constant.

In the above clutch engaging state, the engine power inputted in the first flywheel 32 is transmitted through two paths: a path through the clutch disc 34 and a path through the second flywheel 36, the facing 248 and the friction plate 250 to the transmission.

Accordingly, concerning a torque (average torque+- fluctuating torque) transmitted from the engine to the transmission, the fluctuating torque is absorbed by the facing 248 and the second flywheel 36 supported resiliently and floatingly by the torsion spring 38. Only the average torque is transmitted through the clutch disc 34 to the transmission, so that the engine rotational fluctuation and the torque fluctuation can be removed approximately completely.

As compared with a clutch disc 102 illustrated in FIG. 13, the friction plate 250 is only fastened to the spline hub 35f so that a structure of the clutch disc 34 is very simple.

Moreover, when the entire clutch disc 34 is replaced due to worn-out of the facings 35a & 248 after a long period of use, also the friction plate 250 and the facing 248 are replaced together with the clutch disc 34. Therefore, all consuming parts of the friction damping mechanism 240 are installed at the clutch disc 34 side so that the first flywheel 32 side and the second flywheel 36 side are not required to be disassembled.

(Effect)

As described above, in the flywheel assembly of the fourth embodiment, the coned disc spring 246 (spring member) of the friction damping mechanism 240 is formed into the approximately annular shape connected to the radially intermediate part of the first flywheel 32, the approximately annular intermediate plate 252 pressing on the coned disc spring 246 is provided in such the manner as freely engaged with or disengaged from the facing 248 (friction member), and the facing 248 is connected to the clutch disc 34 through the approximately annular friction plate 250. Therefore, it is enough for the clutch disc 34 to fasten the friction plate 50 to the spline hub 35f as compared with the clutch disc 102 of FIG. 13, so that the structure of the clutch disc 34 becomes simple.

Further, when the entire clutch disc 34 is replaced due to worn-out of the facings 35a & 248 after a long period of use, the friction plate 250 and the facing 248 are also replaced together with the clutch disc 34. Therefore, all consuming parts of the friction damping mechanism 240 are installed at the clutch disc 34 side so that the first flywheel 32 side and the second flywheel 36 side are not required to be disassembled and its maintenance becomes easy.

Moreover, a diameter of the coned disc spring 246 becomes larger than that of the coned disc spring 114 of FIG. 13, so that a design of the coned disc spring 246 becomes easy because it is not required to generate a large force with a small diameter.

What is claimed:

1. A flywheel assembly including a first flywheel fastened to an engine crank shaft and engaged and disengaged by a clutch disc having a spline hub and a friction plate, a second flywheel supported concentrically with the first flywheel and set to a specific mass, a damper mechanism resiliently connecting the flywheels to each other, and a friction damping mechanism which transmits power from the second flywheel to the spline hub of the clutch disc and damps vibration only when said clutch disc contacts with the first flywheel; characterized by that a spring member of the friction damping mechanism has an approximately annular shape connected to a radially inner part of said second flywheel, an approximately annular intermediate plate pressing on said spring member is provided in such a manner as freely engaged with or disengaged from a friction member, and said friction member is connected to said clutch disc through said friction plate.

2. A flywheel assembly as set forth in claim 1, in which the friction damping mechanism is composed of a bolt connected to a second flywheel, an annular retaining ring fixed to the bolt, said intermediate plate held to said retaining ring, said spring member interposed between said intermediate plate and said retaining ring, and said friction member fastened to said friction plate facing said intermediate plate.

3. A flywheel assembly including a first flywheel fastened to an engine crank shaft and engaged and disengaged by a clutch disc having a spline hub and a friction plate, a second flywheel supported concentrically with the first flywheel and set to a specific mass, a damper mechanism resiliently connecting the flywheels to each other, and a friction damping mechanism which transmits power from the second flywheel to the spline hub of the clutch disc and damps vibration only when said clutch disc contacts with the first flywheel, characterized by that a spring member of the friction damping mechanism has an approximately annular shape connected to a radially inner part of said second flywheel, an approximately annular intermediate plate pressing on said spring member is provided in such manner as freely engaged with or disengaged from a friction member: said friction member is connected to said clutch disc through said friction plate; the friction damping mechanism being composed of a bolt connected to the second flywheel, an annular retaining ring fixed to the bolt, said intermediate plate held to the retaining ring, said spring member interposed between said intermediate plate and said retaining ring, and said friction member fastened to said friction plate opposing said intermediate plate; a claw is projectingly provided at an outer peripheral part of said intermediate plate, said claw fitting into a notch opening to an outer peripheral flange of the retaining ring, and the intermediate plate is installed freely slidingly in the axial direction of said flywheel.

* * * * *